United States Patent [19]
Cadotte et al.

[11] Patent Number: 4,765,897
[45] Date of Patent: Aug. 23, 1988

[54] POLYAMIDE MEMBRANES USEFUL FOR WATER SOFTENING

[75] Inventors: John E. Cadotte, Minnetonka, Minn.; David R. Walker, Kilmarnock, Scotland

[73] Assignee: The Dow Chemical Company, Midland, Mich.

[21] Appl. No.: 856,519

[22] Filed: Apr. 28, 1986

[51] Int. Cl.$^4$ ................ B01D 13/00; B32B 27/34
[52] U.S. Cl. ................ 210/500.23; 210/500.35; 210/500.38; 427/245; 428/420; 428/476.3
[58] Field of Search ............ 428/420, 476.3; 210/500.23, 500.38, 500.33, 500.34, 500.35; 427/244-246

[56] References Cited

U.S. PATENT DOCUMENTS

| | | | |
|---|---|---|---|
| 3,551,331 | 12/1970 | Cescon et al. | 210/23 |
| 3,853,755 | 12/1974 | Ganci | 210/23 |
| 3,877,978 | 4/1975 | Kremen et al. | 210/23 |
| 3,886,066 | 5/1975 | Chen et al. | 210/23 |
| 4,259,183 | 3/1981 | Cadotte | 210/654 |
| 4,277,344 | 7/1981 | Cadotte | 210/654 |
| 4,520,044 | 5/1985 | Sundet | 210/500.2 X |
| 4,567,009 | 1/1986 | Badenhop et al. | 264/41 |
| 4,618,533 | 10/1986 | Steuck | 427/245 X |

OTHER PUBLICATIONS

Report No. PB-81-170607 "Development of Improved Cleaning and Surface Regeneration Methods and Economic Analysis of These Methods for Sea Water Membranes", Burns and Roe, Inc., Paramus, NJ, prepared for Office of Water Research and Technology, Washington, DC-Jan. 31, 1981-U.S. Department of Commerce, National Technical Information Service.

Proceedings of the Second World Congress on Desalination and Water Re-use; vol. 3; Nov. 17-22, 1985; Bermuda; pp. 203-226, W. J. Conlon, "Pilot Field Test Data for Prototype Ultra Low Pressure R.O. Elements".

*Primary Examiner*—Tom Wyse

[57] ABSTRACT

A novel water softening membrane and process for making the same is described. The membrane can be prepared by treating a polyamide reverse osmosis membrane with a strong mineral acid followed by treatment with a rejection enhancing agent. The resulting membrane at transmembrane pressures of 50 psi can attain a magnesium sulfate rejection with a 0.2 percent aqueous solution of more than 90 percent with a water flux of more than 15 gallons per square foot per day.

31 Claims, No Drawings

POLYAMIDE MEMBRANES USEFUL FOR WATER SOFTENING

BACKGROUND OF THE INVENTION

This invention relates to membranes useful for removal of ions imparting hardness to water.

A variety of treatments are employed for the removal of hardness factors from water. These hardness factors are principally calcium or magnesium salts of sulfate or bicarbonate. Lime softening is widely used, but requires large quantities of lime and certain practical limitations. Ion exchange is widely used where the cost of the ion exchange resin and regeneration of the resin are not prohibitive. Electrodialysis has been employed, but is relatively costly.

Reverse osmosis membranes have been employed for water softening. Cellulose diacetate membranes and polyamide membranes have been used commercially for this purpose. However, these prior art membranes in general have required relatively high operating pressures and have been viewed as energy intensive.

U.S. Pat. No. 3,551,331 describes the treatment of certain polyamide membranes with acid. This treatment, performed on melt-processed linear aliphatic polyamide membranes of extremely low water permeability, produced higher water permeabilities by a combination of solvent induced crystallization and solvent extraction of low molecular weight non-crystalline fractions. The resulting membranes still required high operating pressures to achieve commercially feasible water permeation rates.

U.S. Pat. Nos. 3,853,755 and 3,866,066 describe the use of hydrolyzable tannins to modify the rejection of reverse osmosis membranes. However, the colloid in general reduces flux through a membrane.

A membrane which affords a combination of high flux, adequate rejection of hardness ions and very low operating pressures has long been sought. More specifically, a membrane which has a flux of at least about 10, preferably at least about 15 gallons per square foot per day (gfd) and a magnesium sulfate rejection of at least about 85 percent at a transmembrane pressure in the range from about 50 to about 100 pounds per square inch (psi), preferably from about 50 to about 70 psi, and temperature of 25° C. using feed water containing 0.2 weight percent magnesium sulfate would be desirable.

SUMMARY OF THE INVENTION

A novel water softening membrane and process for making the same has now been discovered. The process comprises contacting a crosslinked polyamide discriminating layer of a reverse osmosis membrane with a strong mineral acid. The membrane in contact with the acid is maintained at an elevated temperature for a period sufficient to produce a membrane having a flux of at least about 8 gfd and a magnesium sulfate rejection of at least about 65 percent when tested under reverse osmosis conditions at 50 psi and 25° C. using an aqueous solution of 0.2 weight percent magnesium sulfate, with the proviso that the sum of the flux in gfd and the MgSO$_4$ rejection in percent is at least about 90. The resulting membrane is treated with a rejection enhancing agent so as to produce a membrane having a magnesium sulfate rejection of at least about 85 percent, preferably about 90 percent, more preferably 95 percent at the aforementioned conditions.

The final membrane product possesses an unusually high flux and good rejection of calcium and magnesium sulfate or bicarbonate salts. This membrane is advantageous in that it can be used at operating pressures much lower than prior art reverse osmosis membranes.

DETAILED DESCRIPTION OF THE INVENTION

Reverse osmosis membranes having polyamide discriminating layers are well-known in the art. The polyamide can be aliphatic or aromatic and is advantageously crosslinked. Illustrative prior art polyamide membranes are described in Columns 2-4 of U.S. Pat. No. 4,277,344, which is incorporated herein together with the references cited therein. In addition, U.S. Pat. No. 4,259,183 describes other useful polyamide membranes made by the interfacial reaction of a cycloaliphatic diamine with isophthaloyl chloride, trimesoyl chloride or mixtures of these acid chlorides, which are incorporated herein by reference. U.S. Pat. No. 4,520,044 describes other suitable polyamide membranes, such as those prepared by reaction of m-phenylene diamine and cyclohexane-1,3,5-tricarbonyl chloride.

In a preferred embodiment of this invention, the reverse osmosis membrane starting material has a polyamide discriminating layer which is a reaction product of (a) aromatic polyamines having at least two primary amines on an aromatic nucleus, and (b) aromatic polyfunctional acyl halides having an average of more than two acyl halide groups on an aromatic nucleus. These polyamides preferably have a crosslink density of at least about 10, more preferably at least about 50, per 100,000 polymer molecular weight. Such polyamide membranes are described in U.S. Pat. No. 4,277,344, which is incorporated herein by reference.

The preferred polyamine reactant is phenylene diamine, more preferably the meta isomer of this diamine. The preferred polyfunctional acyl halide is trimesoyl halide or a functional equivalent, more preferably trimesoyl chloride. The reaction product of trimesoyl halide and phenylene diamine is referred to hereinafter as poly(phenylene diamine trimesamide).

The reverse osmosis membrane prior to acid treatment preferably has a sodium chloride rejection of at least about 90 percent and a flux of at least about 10 gfd when tested with an aqueous solution of 2,000 parts per million (ppm) sodium chloride at 200 psi and 25° C. More preferably prior to acid treatment, the sodium chloride rejection of the membrane is in the range from about 93 to about 98 percent with a flux in the range from about 15 to about 30 gfd.

Reverse osmosis membranes having a polyamide discriminating layer are available in a variety of configurations. Flat sheet, tubular and hollow fiber membranes are well-known in the prior art. These membranes can also vary in morphology. Homogeneous membranes are operable, but asymmetric membranes are preferred, with thin film composite membranes being most preferred for membranes treated in accordance with this invention.

The thin film composite membranes can be prepared via conventional techniques for depositing, forming or laminating a polyamide discriminating layer to a porous support layer. This support layer generally determines the shape of the membrane. This support may be a tubular, hollow fiber or flat sheet configuration.

Suitable support layers or films have been described extensively in the art. Illustrative support materials include organic polymeric materials such as polysulfone, polyethersulfone, chlorinated polyvinyl chloride, styrene/acrylonitrile copolymer, polybutylene terephthalate, cellulose esters and other polymers which can be prepared with a high degree of porosity and controlled pore size distribution. Porous inorganic materials may also be operable as supports. Preferably, the pores in the polymers will range in size from about 1 to about 1,000 millimicrons in their widest dimension at the surface in intimate contact with the discriminating layer. Especially preferred as support layers are porous polysulfone films. These films are generally cast on non-woven fabric or woven cloth, generally of polyester or polypropylene.

The support layer provides mechanical strength to the thin film composite membrane. The support layer is advantageously as thin as possible, while still imparting the desired physical strength to the membrane.

In an especially preferred embodiment of this invention, the polyamide discriminating layer is formed on the support layer via interfacial polymerization. To illustrate, the porous support layer can be coated or imbibed with an aqueous solution of a polyamine. Surface active agents can be present on the support layer or in the solution to augment film formation. A water-immiscible solvent containing a polyfunctional acyl halide can then be brought into contact with the support layer at conditions conducive to polymerization. This solvent is advantageously a $C_5$ to $C_8$ alkane, a chloroalkane, a fluoroalkane or chlorofluoroalkane which does not deleteriously affect the support layer. By this technique a thin, essentially defect-free discriminating layer can be formed. Crosslinked polyamide discriminating layers as described in U.S. Pat. No. 4,277,344 are most preferred.

The polyamide discriminating layer is desirably as thin as possible, while still remaining essentially defect free. In general, the water flux through the discriminating layer is inversely proportional to the thickness of the layer. However, a thin layer is also more prone to defects or discontinuities in the layer.

In a preferred embodiment of this invention, the reverse osmosis membrane after treatment with acid is assembled in a reverse osmosis device, optionally including a pressure vessel, prior to treatment with the rejection enhancing agent. The treatment of the device itself obviates post-treatment handling operations which can create defects in the membrane discriminating layer. The membrane can be assembled in a variety of devices known in the prior art. For example, flat sheets can be utilized in either plate and frame or spiral devices. Tubular and hollow fiber membranes can be assembled in a generally parallel bundle in devices with tubesheets at opposing ends of the membranes. Alternatively, these membranes can be assembled in a U-shaped bundle with both ends secured in a single tubesheet. Hollow fiber membrane devices can optionally be assembled about a central perforated core, have a central tubesheet or be assembled in a bias wrap configuration as in U.S. Pat. No. 4,080,296. Radial, axial or down-the-bore flow of feed can be utilized in hollow fiber devices. Spiral membrane devices are especially preferred.

The polyamide discriminating layer of a reverse osmosis membrane is contacted with an aqueous solution of a compatible strong mineral acid. A compatible strong mineral acid, as the term is used herein, refers to inorganic acid which can modify the structure of the polyamide discriminating layer so as to increase the permeability to water. Generally, the acid will decrease salt rejection of the polyamide, but otherwise does not deleteriously affect the membrane. The acid is believed to swell the polyamide, but the invention is not to be limited by this theory. Advantageously, the mineral acid is polyphosphoric acid, phosphoric acid, phosphorous acid, sulfuric acid or mixtures thereof. Phosphoric acid is especially preferred with concentrations of from about 50 to about 85 weight percent being advantageous. Polyphosphoric acid is also advantageous, but it is more difficult to apply in a thin uniform coat because of the high viscosity of solutions of this acid.

The concentration of the strong mineral acid can operably vary over a wide range. Typically, an aqueous solution containing from about 10 to about 85 weight percent acid (or the saturation point of the acid in water, if less) is operable. Acid solutions containing at least about 40 weight percent phosphoric acid are especially preferred, with those containing at least about 10 weight percent sulfuric acid or at least about 20 weight percent phosphorous acid being preferred.

The strong mineral acid solution can be applied to the membrane by any convenient means which affords uniform and intimate contact with the discriminating layer. This layer may be conveniently sprayed, immersed or washed with acid. Typically, it is desirable to apply from about 0.5 to about 25, preferably about 1 to about 20, more preferably about 4 to about 10 grams of acid per square meter of membrane.

The temperature at which the acid is applied is not generally critical. Ambient temperatures are typically convenient. In order to effect a change in permeability of the membrane, it is preferred to subject the membrane to an elevated temperature (typically about 50° to about 150° C., preferably about 100° to 150° C. for phosphoric acid, 110° to 120° C. being more preferred for phosphoric acid) during contact with the acid. When phosphoric acid is employed it is desirable during contact with the membrane to evaporate the water present as a solvent for the acid. This is believed to result in the formation of polyphosphoric acid. Because the acid strength, identity of the polyamide discriminating layer, acid concentration, contact temperature and contact time are interrelated, it is not possible to specify optimum values for each of these parameters independently. For example, highly crosslinked membranes can typically be treated at higher temperatures than those with a lower crosslink density. At higher temperatures the optimum contact time will be shorter, but if the temperature is too high the membrane may shrink nonuniformly with undesirable consequences. These process parameters are readily optimized empirically for a specific membrane.

In one preferred embodiment of the invention, a polyamide thin film composite reverse osmosis membrane is coated with 85 percent phosphoric acid with excess acid being removed by use of a squeeze roller. The membrane is then heated to a temperature in the range of about 100° to about 140° C. for about 5 to about 15 minutes. It may be desirable to restrain the membrane during drying to control shrinkage. After heating, the membrane discriminating layer appears dry to the unassisted human eye. In general, lower temperatures and shorter reaction times in the preferred range afford a higher salt rejection for the membrane than at more extreme treatment conditions. Typically, higher temperatures and longer reaction times provide a greater increase in flux but suffer some loss of salt rejection. The membrane can be rinsed or washed with water after treatment, but this is not generally necessary.

The reverse osmosis membrane after acid treatment should retain good rejections of divalent alkaline earth salts of bicarbonate or sulfate with much higher water fluxes than the same membrane prior to treatment. Desirably, the water flux is at least about 50, preferably at least about 100, percent greater after treatment than before. The rejection of calcium and magnesium salts may also decline somewhat during acid treatment. Preferably, the acid-treated membrane will have a flux of at least about 20 gfd and a rejection of at least 75 percent when tested under reverse osmosis conditions at 50 psi and 25° C. using an aqueous solution of 0.2 weight percent $MgSO_4$. In some especially preferred embodiments, either the flux can be at least about 35 gfd with a $MgSO_4$ rejection of at least about 75 percent or a $MgSO_4$ rejection of at least about 85 percent with a water flux of at least about 20 gfd at the aforementioned conditions.

The acid-treated membranes have been found to exhibit considerable variation in performance. This variation has been attributed in part to the formation of defects in the discriminating layer during acid treatment. The treatment of the acid-treated membranes with a rejection enhancing agent not only enhances the rejection of individual membranes, but also reduces the variability of flux and rejection.

The term "rejection enhancing agents" is used herein to refer to compositions which when applied to reverse osmosis membranes increase the rejection of the membranes. Advantageously, the rejection is increased with minimal decline in the flux. These agents are believed, in preferred embodiments, to selectively plug microscopic leaks and defects in the membrane discriminating layer. The preferred agents can even seal the porous support where discontinuities exist in the discriminating layer.

One preferred class of rejection enhancing agents is generally colloids (i.e., water-dispersible polymers). Illustrative of operable colloids are tannic acid or hydrolyzable tannins as described in U.S. Pat. No. 3,886,066 and branched polyamidoamines optionally bearing other substituents as described in U.S. Pat. Nos. 4,435,548; 4,507,466 and 4,568,737. Other operable colloidal treatments known in the prior art are described in NTIS Report No. PB81-170607, entitled "Development of Improved Cleaning and Surface Regeneration Methods and Economical Analysis of these Methods for Seawater Membranes" and NTIS Report No. PB82-157975, entitled "Post-Treatment Process for Reverse Osmosis Membranes", which are incorporated herein by reference.

Another class of rejection enhancing agents includes certain water-soluble polymers or copolymers of sufficiently high molecular weight that they are effective to enhance rejection of a membrane. Illustrative of this class of reagents are the vinyl acetate copolymers described in U.S. Pat. No. 3,877,978, but in general the vinyl acetate copolymers reduce flux more than other preferred reagents. Many copolymers of hydroxyalkyl methacrylate (preferably having 5 to 7 carbon atoms) with other ethylenically unsaturated monomers are also operable rejection enhancing agents. Copolymers of hydroxyethyl methacrylate with methacrylic acid or methacrylamide, optionally including other compatible monomers, are preferred. Another preferred agent is a copolymer of styrene and maleic anhydride which has been treated with ammonia to produce styrene/maleamic acid copolymers. Advantageously, the styrene and maleic anhydride are polymerized in approximately equimolar amounts.

Generally, the colloidal agent in an aqueous diluent is brought into contact with the discriminating layer. Other diluents can be used so long as the colloidal dispersion is maintained and the membrane is not deleteriously affected. The pH of the diluent may need to be adjusted to provide the desired colloidal dispersion. For example, tannic acid in colloidal form or hydrolyzable tannin is preferably applied in an acidic (pH advantageously in the range of about 2 to about 5) aqueous medium. Tannic acid can be applied in a medium at above pH 5, if no tannin precipitating agents, such as polyvalent metal ions are present. The concentration of the colloid can operably vary over a wide range dependent upon the colloid, the membrane and other factors. Generally, a concentration of from about 10 to about 1,000 ppm is preferred for tannic acid, with about 100 to about 300 ppm by weight being more preferred.

The water-soluble polymers are applied to the acid-treated membrane in a manner generally similar to the colloidal agents. An aqueous diluent is preferred, but other diluents are operable. The concentration of the agent can operably vary over a wide range dependent on the same factors as with colloids. Typically, a concentration of from about 1 to about 100 ppm of the agent is preferred, with from about 5 to about 30 ppm being more preferred for water-soluble polymers.

The rejection enhancing agent can be applied to the membrane via any conventional or convenient technique. With many reagents a contact time of about 1 to about 30 minutes is typically required to achieve the desired increase in rejection. Of course, optimum contact will vary dependent upon the membrane, agent and other factors. Consequently, immersion of the membrane with the discriminating layer in contact with an aqueous solution of the agent is convenient. As previously noted, one especially preferred technique is to assemble the acid-treated membrane in a reverse osmosis device and then provide the agent in an aqueous solution introduced to the feed side of the membrane.

If desired, more than one rejection enhancing agent can be sequentially applied. A mixture of rejection enhancing agents can also be used, so long as they are compatible.

It may be desirable in some embodiments of the invention to rinse the discriminating layer surface with water after treatment with the rejection enhancing agent to remove any excess agent deposited on the membrane. For example, an acidic water rinse step after contact with a tannic acid colloid to remove excess deposits can increase flux.

The temperature and pressure during contact with the rejection enhancing agent are not generally critical, provided that the membrane is not deleteriously affected. Temperatures of from about 10° to about 45° C. are generally convenient, with ambient temperatures being preferred. The pressure can also conveniently be ambient, although in some embodiments a moderate positive pressure (generally less than about 250 psig transmembrane pressure) applied to the discriminating layer of the membrane is desirable.

Specific rejection enhancing agents may require special conditions or procedures. In general, these procedures are known in the art.

The molecular weight of the polymeric rejection enhancing agent must be great enough to provide the desired rejection enhancing properties, but not so great that the polymer adversely affects the characteristics of the treated membrane. The operable molecular weight range will depend upon the membrane, polymer agent and other factors.

Modifications of the aforementioned rejection enhancing agents and other compounds having like utility will be apparent to one of ordinary skill in the art. The term "rejection enhancing agent" is intended to encompass any colloid or polymer which can increase the magnesium sulfate rejection of the acid-treated membrane at standard conditions by at least about 10 percent of the initial rejection. For example, if the acid-treated membrane has a $MgSO_4$ rejection of 70 percent, the rejection enhancing reagent should raise the rejection to at least about 77 percent. Preferably, the rejection enhancing agent decreases the water flux by not more than about 35 percent using a 0.2 percent $MgSO_4$ feed at standard conditions. For example, if the flux of the acid-treated membrane was 40 gfd, the flux of the membrane after treatment with the rejection enhancing agent should be at least about 26 gfd. The most preferred rejection enhancing agents will show the smallest reduction in flux.

Another class of rejection enhancing agents are coacervate coatings. These coatings are prepared by first applying to the membrane in solution a polymer or polymerizable monomer bearing moieties of a first charge followed by a solution containing a polymer or polymerizable monomer bearing moieties of an opposite charge to the first, so as to form a coacervate. For example, the moieties of the first charge can be sulfonium or quaternary ammonium groups and the moieties of the second charge can be carboxylate groups. Polymers prepared from ethylenically unsaturated monomers, such as methacrylic acid and hydroxyethyl methacrylate or vinyl benzyl sulfonium chloride, methyl methacrylate and hydroxyethylmethacrylate are preferred. It may be advantageous to include monomers bearing hydrophobic moieties in these polymers to modify the polymer characteristics. The polymers of the first and second charges are conveniently applied sequentially to the membrane in dilute aqueous diluents (preferably from about 1 to about 25 ppm by weight). Optionally, the aqueous diluents can include a fluorocarbon surfactant. The coacervate rejection enhancing agents are further described in U.S. application Ser. No. 790,287, filed Oct. 22, 1985, which is incorporated herein by reference.

The following examples are presented to illustrate, but not otherwise limit the invention. All parts and percentages are by weight unless otherwise indicated. Salt rejection and water flux were determined at recoveries of about 1 percent.

EXAMPLES 1-7, COMPARATIVE EXPERIMENT A

A sample of a thin film composite membrane bearing a poly(phenylene-diamine trimesamide) discriminating layer on a porous polysulfone support (sold by FilmTec Corporation as FT-30 membrane) was tested to determine its magnesium sulfate rejection and water flux using a 0.2 percent solution of magnesium sulfate at 50 psi and 25° C. An aqueous solution of phosphoric, phosphorous or sulfuric acid was applied to samples of the same membrane affixed with adhesive tape to glass plates. Excess acid was removed with a rubber squeeze roller applying firm rolling pressure manually. The membrane samples were then heated at 120°±20° C. for about 10 minutes. The acid-treated membranes were then tested at the same conditions as Comparative Example A to determine the water flux and magnesium sulfate rejection. The results of these tests are tabulated in Table I.

TABLE I

| Example | Acid Concentration (Percent) | Acid | Water Flux (gfd) | $MgSO_4$ Rejection (Percent) |
|---|---|---|---|---|
| A | None | | 4 | 97 |
| 1 | 8.5 | Phosphoric | 8 | 96.5 |
| 2 | 14 | Phosphoric | 15 | 91 |
| 3 | 30 | Phosphoric | 32 | 83 |
| 4 | 42.5 | Phosphoric | 27 | 82 |
| 5 | 85 | Phosphoric | 39 | 65 |
| 6 | 50 | Phosphorous | 29 | 81 |
| 7 | 50 | Sulfuric | 27 | 67 |

The data tabulated in Table I confirm that treatment of polyamide membranes with strong mineral acids can significantly increase the water flux through the membrane. Generally, the rejection decreases with increasing flux.

EXAMPLES 8-11

In a manner otherwise similar to Example 5, the polyamide membrane was contacted with 85 percent phosphoric acid at a temperature of 100°, 110°, 120° or 140° C. for 10 minutes. The water flux and magnesium sulfate rejection were then determined at the standard conditions used in Example 5. The results are tabulated in Table II.

TABLE II

| Example | Temperature | Water Flux (gfd) | $MgSO_4$ Rejection (Percent) |
|---|---|---|---|
| 8 | 100 | 19 | 90.8 |
| 9 | 110 | 23 | 92 |
| 10 | 120 | 32 | 83 |
| 11 | 140 | 41 | 75 |

The data in Table II suggest that if other parameters remain the same, a higher temperature during acid treatment results in a higher water flux but lower rejection of magnesium sulfate.

EXAMPLES 12-15

Four samples of a polyamide membrane were contacted with 85 percent phosphoric acid and heated at about 120° C. for approximately 15 minutes in the general manner of Example 5. Four spiral membrane devices were then prepared from the acid-treated membranes. The rejection and flux of each membrane was measured using a 0.2 percent magnesium sulfate feed at an average pressure of 60 psi and about 20° C.

Each spiral membrane was then treated at ambient temperatures with an aqueous feed at a pH of 2 containing 300 ppm of tannic acid for 15 minutes at a pressure of about 100 psi. The tannic acid treatment was followed by a relatively high flow, low pressure rinse with an aqueous hydrochloric acid feed at a pH in the range from about 3 to about 5 for 20 minutes. This rinse removed excess tannic acid deposited. The membranes were then once more tested in the aforementioned manner to determine magnesium sulfate rejection. The results are presented in Table III.

TABLE III

| | Before Tannic Acid | | After Tannic Acid | |
|---|---|---|---|---|
| Example | Flux (gfd) | Rejection Percent | Flux (gfd) | Rejection Percent |
| 12 | 42.8 | 82.2 | 29.4 | 94.7 |
| 13 | 43.1 | 79.1 | 31.7 | 94.4 |
| 14 | 32.5 | 78.6 | 23.8 | 93.5 |
| 15 | 30.7 | 84.7 | 21.3 | 94.9 |

The results tabulated in Table III confirm that the membranes described herein possess both a high rejection (90+ percent) of magnesium sulfate and an excellent flux (20 gfd). In addition, these membranes exhibit good chemical stability and can be operated at feed water pressures much lower than the 200 to 250 psi typical of reverse osmosis membranes.

What is claimed is:

1. A membrane useful for water softening which is prepared by a process comprising:
   (a) contacting a crosslinked polyamide discriminating layer of a reverse osmosis membrane with an aqueous solution of a compatible strong mineral acid;
   (b) maintaining the membrane in contact with the acid at an elevated temperature for a period sufficient to produce a membrane having a water flux of at least about 8 gfd and a $MgSO_4$ rejection of at least about 65 percent when tested under reverse osmosis conditions at 50 psi and 25° C. using an aqueous solution of 0.2 weight percent $MgSO_4$; and
   (c) contacting the membrane from step (b) with a rejection enhancing agent so as to produce a membrane having a $MgSO_4$ rejection of at least about 85 percent.

2. The membrane as described in claim 1 with the proviso that the sum of the water flux in gfd and $MgSO_4$ rejection in percent after acid treatment in step (b) is at least about 90.

3. The membrane as described in claim 2 wherein the polyamide is a crosslinked, aromatic polyamide.

4. The membrane as described in claim 3 wherein the membrane is a thin film composite membrane.

5. The membrane as described in claim 4 wherein the membrane is a flat sheet membrane.

6. The membrane as described in claim 5 wherein the membrane from step (b) is assembled in a spiral membrane device prior to step (c).

7. The membrane as described in claim 6 wherein the polyamide is a poly(phenylene diamine trimesamide) and the acid in step (a) is phosphoric acid.

8. The membrane as described in claim 7 wherein the rejection enhancing agent is a tannic acid colloid.

9. The membrane as described in claim 7 wherein the rejection enhancing agent is styrene/maleamic acid copolymer.

10. The membrane as described in claim 7 wherein the rejection enhancing agent is a copolymer of hydroxyethyl methacrylate and methyl methacrylate or methacrylamide and including up to 20 weight percent of other compatible ethylenically unsaturated monomers.

11. The membrane as described in claim 7 wherein the rejection enhancing agent is a coacervate prepared from a first polymer bearing a plurality of sulfonium or quaternary ammonium groups and a second polymer bearing a plurality of carboxylate groups.

12. The membrane as described in claim 4 wherein the membrane is a tubular membrane.

13. The membrane as described in claim 2 wherein the acid in step (a) is phosphoric acid in a concentration in the range from about 50 to about 85 weight percent aqueous solution.

14. The membrane as described in claim 1 wherein the acid in step (a) is selected from the group consisting of phosphoric acid, phosphorous acid and sulfuric acid.

15. The membrane as described in claim 1 wherein the reverse osmosis membrane in step (a) has a sodium chloride rejection of at least about 90 percent and a flux of at least about 10 gfd when tested with an aqueous solution of 2,000 ppm sodium chloride at 200 psi and 25° C.

16. The membrane as described in claim 1 wherein the polyamide is a poly(phenylene diamine trimesamide).

17. The membrane as described in claim 1 wherein the membrane has a water flux of at least about 15 gfd and a rejection of at least about 90 percent when tested with an aqueous solution of 0.2 percent magnesium sulfate at 50 psi and 25° C.

18. The membrane as described in claim 1 wherein the rejection enhancing agent is a colloid.

19. The membrane as described in claim 18 wherein the rejection enhancing agent is a tannic acid colloid which contacts the membrane in an aqueous acidic medium at a pH in the range from about 2 to about 5.

20. The membrane as described in claim 1 wherein the rejection enhancing agent is a styrene/maleamic acid copolymer or a $C_5$ to $C_7$ hydroxyalkyl methacrylate polymer, copolymer or terpolymer.

21. The membrane as described in claim 1 wherein the rejection enhancing agent is a coacervate.

22. A membrane useful for water softening comprising:
   (a) a porous support layer;
   (b) a crosslinked, aromatic polyamide discriminating layer affixed to the support layer, the discriminating layer having a first surface not in direct contact with the support layer; and
   (c) a rejection enhancing agent coating at least part of the first surface of the discriminating layer, wherein the membrane has a water flux of at least about 15 gfd and a rejection of at least about 90 percent when tested with an aqueous solution of 0.2 percent magnesium sulfate at 50 psi and 25° C.

23. The membrane as described in claim 22 wherein the polyamide is a poly(phenylene diamine trimesamide).

24. The membrane as described in claim 23 wherein the support layer is a porous polysulfone or polyether sulfone.

25. The membrane as described in claim 24 wherein the membrane is in the form of a flat sheet.

26. The membrane as described in claim 25 wherein the membrane is present in a spiral membrane device.

27. The membrane as described in claim 25 wherein the membrane is present in a plate and frame device.

28. The membrane as described in claim 25 wherein the rejection enhancing agent is a tannic acid colloid.

29. The membrane as described in claim 25 wherein the rejection enhancing agent is a styrene/maleamic acid copolymer or a $C_5$ to $C_7$ hydroxyalkyl methacrylate polymer, copolymer or terpolymer.

30. The membrane as described in claim 25 wherein the rejection enhancing agent is a copolymer of hydroxyethyl methacrylate and methyl methacrylate or methacrylamide and including up to 20 weight percent of other compatible ethylenically unsaturated monomers.

31. The membrane as described in claim 25 wherein the rejection enhancing agent is a coacervate prepared from a first polymer bearing a plurality of sulfonium or quaternary ammonium groups and a second polymer bearing a plurality of carboxylate groups.

* * * * *